United States Patent Office 3,709,982
Patented Jan. 9, 1973

3,709,982
SYNTHESIS OF OXYCHLORINE TRIFLUORIDE
Charles B. Lindahl, Woodland Hills, Calif., assignor to North American Rockwell Corporation, El Segundo, Calif.
No Drawing. Filed June 22, 1967, Ser. No. 649,423
Int. Cl. C01b 11/02, 11/24
U.S. Cl. 423—466
4 Claims

ABSTRACT OF THE DISCLOSURE

Synthesis of oxychlorine trifluoride by the reaction of elemental fluorine with an alkali metal chlorite or an alkaline earth chlorite.

---

The invention herein described was made in the course of or under a contract with the Department of the Navy.

REFERENCES TO CO-PENDING APPLICATIONS

This invention relates to a method of synthesizing oxychlorine trifluoride. In co-pending application Ser. No. 543,493, filed Apr. 13, 1966, having a common assignee, oxychlorine trifluoride, $OClF_3$, was disclosed as a new oxidizer compound. Additionally, two methods of preparation of the compound are set forth. One of the methods relates to reacting $Cl_2O$ with fluorine, while the second method comprises reacting $Cl_2O$ with an alkali metal fluoride to form a complex with subsequent fluorination of the complex to obtain $OClF_3$.

In co-pending application Ser. No. 551,490, filed May 13, 1966, having a common assignee, two other methods for forming the compound $OClF_3$ were disclosed. Both of them relate to reactions of fluorine with chlorine nitrate.

The object of the herein invention is to disclose additional methods of making the oxidizer oxychlorine trifluoride, $OClF_3$.

DESCRIPTION OF THE INVENTION

The process of the instant invention comprises reacting elemental fluorine with an alkali metal chlorite or alkaline earth chlorite at temperatures of from $-196°$ C. to $+25°$ C.

The lighter alkali metal chlorites (i.e., lithium chlorite, sodium chlorite and potassium chlorite) and alkaline earth chlorites (i.e., beryllium chlorite, magnesium chlorite, and calcium chlorite) are preferred in the process of the instant invention, due to their higher reactivity in an ionized state.

Unlike some previous reactions, the syntheses of the instant invention can be performed with inexpensive commercially available starting materials. Consequently, the cheaper alkali metal or alkaline earth chlorites are preferred, e.g., sodium chlorite and potassium chlorite. The reaction can take place at decreased, atmospheric, or above atmospheric pressures. It can be conducted at temperatures ranging from $-196°$ C. to $+25°$ C. However, higher temperatures increase the rate of reaction. Improved yields have been encountered at lower temperatures. Thus, temperatures between about $-90°$ C. and about $-30°$ C. are preferred. The reaction can take place in vessels known in the art to be suitable for elemental fluorine reactions, e.g., Monel and stainless steel. Reaction is initiated almost immediately, but residence times of several hours or even days produce higher yields.

In addition to the $ClF_3O$ produced, some side products are produced. Among these are $NaF$, $O_2$, $FClO_2$, and sometimes $ClF$ and $ClF_3$. The desired $ClF_3O$ can be separated from side products by fractional condensation by means known in the art, e.g., by cold traps at $-95°$ C.

The process of the instant invention is illustrated by the following examples:

Example I 10 grams of sodium chlorite was placed in a 300 ml. stainless steel bomb and 2 liters of fluorine at standard temperature and pressure was condensed in at liquid nitrogen temperature. The bomb was then warmed to $-78°$ C. and allowed to remain at that temperature overnight at about two atmospheres. An infrared spectrum of the product gas confirmed the presence of oxychlorine trifluoride.

Example II 3 grams of sodium chlorite was placed in a stainless steel bomb and 1 liter of fluorine at standard temperature and pressure was condensed in at liquid nitrogen temperatures. The bomb was allowed to warm to ambient temperature and remain at that temperature for two and one-half days at about four atmospheres. Infrared indications of oxychlorine trifluoride were found.

Example III 20 grams of potassium chlorite is placed in a Monel bomb and 5 liters of fluorine at standard temperature and pressure is condensed in at liquid nitrogen temperatures. Some reaction transpires immediately at about one-half atmosphere. Upon warming, infrared spectroscopy indicates the presence of oxychlorine trifluoride.

Example IV 13.5 grams of magnesium chlorite is placed in a Monel bomb and 2.2 liters of fluorine at standard pressure and temperature is condensed at liquid nitrogen temperature. The bomb is then warmed to $-90°$ C. and allowed to remain at that temperature for 5 hours. Fractional distillation of the product gas results in the separation of oxychlorine trifluoride.

Since it is obvious that many changes and modifications can be made in the above described details without departing from the nature and spirit of the invention, it is to be understood that the invention is not to be limited thereto except as set forth in the appended claims.

I claim:
1. The process of reacting elemental fluorine with a compound selected from the group consisting of alkali metal chlorites and alkaline earth chlorites, wherein the mol ratio of fluorine to chlorite is 0.5 to 1.5, at temperatures of from $-196°$ C. to $+25°$ C. from zero time to 60 hours, thereby producing oxychlorine trifluoride; and separating the oxychlorine trifluoride thereby produced.
2. The reaction of claim 1 wherein the reaction takes place between $-90°$ C. and $-30°$ C.
3. The reaction of claim 2 wherein the alkali metal chlorites are selected from a group of chlorites consisting of lithium chlorite, sodium chlorite, and potassium chlorite.
4. The reaction of claim 2 wherein the alkaline earth chlorites are selected from the group of chlorites consisting of beryllium chlorite, magnesium chlorite and calcium chlorite.

References Cited

UNITED STATES PATENTS

| | | | |
|---|---|---|---|
| 2,942,947 | 6/1960 | Engelbrecht | 23—203 |
| 2,942,949 | 6/1960 | Barth-Wehrenalp et al. | 23—203 |
| 2,982,618 | 5/1961 | Dess | 23—203 |

CARL D. QUARFORTH, Primary Examiner

F. M. GITTES, Assistant Examiner

U.S. Cl. X.R.
149—1, 109